United States Patent
Yokoyama et al.

(10) Patent No.: US 11,351,563 B2
(45) Date of Patent: Jun. 7, 2022

(54) LIQUID DISPENSING APPARATUS

(71) Applicant: TOSHIBA TEC KABUSHIKI KAISHA, Tokyo (JP)

(72) Inventors: Shuhei Yokoyama, Mishima Shizuoka (JP); Satoshi Kaiho, Yokohama Kanagawa (JP); Ryutaro Kusunoki, Mishima Shizuoka (JP); Seiya Shimizu, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 961 days.

(21) Appl. No.: 16/105,107

(22) Filed: Aug. 20, 2018

(65) Prior Publication Data
US 2019/0060937 A1 Feb. 28, 2019

(30) Foreign Application Priority Data

Aug. 22, 2017 (JP) .............................. JP2017-159470

(51) Int. Cl.
*B05B 12/08* (2006.01)
*G01N 35/10* (2006.01)
*B41J 2/045* (2006.01)

(52) U.S. Cl.
CPC ........... *B05B 12/08* (2013.01); *B41J 2/04541* (2013.01); *B41J 2/04581* (2013.01); *G01N 35/1009* (2013.01); *G01N 35/1072* (2013.01); *G01N 2035/1041* (2013.01)

(58) Field of Classification Search
None
See application file for complete search history.

(56) References Cited

U.S. PATENT DOCUMENTS

| 5,563,634 | A | | 10/1996 | Fujii et al. |
| 5,648,727 | A | * | 7/1997 | Tyberg ................... G01F 23/26 324/667 |
| 6,074,041 | A | | 6/2000 | Imanaka et al. |
| 6,168,252 | B1 | | 1/2001 | Yaji |

(Continued)

FOREIGN PATENT DOCUMENTS

| CN | 1106338 A | 8/1995 |
| CN | 1056803 C | 9/2000 |

(Continued)

OTHER PUBLICATIONS

U.S. Appl. No. 16/105,519, filed Aug. 20, 2018.

(Continued)

*Primary Examiner* — Brian R Gordon
(74) *Attorney, Agent, or Firm* — Kim & Stewart LLP

(57) ABSTRACT

A liquid dispensing apparatus includes a mounting unit on which a liquid discharging device is mounted, a driving circuit to supply driving voltages to an actuator of the liquid discharging device mounted on the mounting unit, a capacitance measuring circuit configured to measure a capacitance value of the actuator and a controller configured to acquire the capacitance value, compare the capacitance value to a predetermined threshold value, and determine whether to supply a first control signal to the driving circuit to drive the actuator of the liquid discharging device to discharge a liquid based on the comparison of the capacitance value to the predetermined threshold value.

8 Claims, 9 Drawing Sheets

(56) References Cited

U.S. PATENT DOCUMENTS

| | | | |
|---|---|---|---|
| 6,604,054 B2 * | 8/2003 | Lipscomb | G01N 35/1009 138/104 |
| 7,396,511 B2 * | 7/2008 | Fujii | G01N 35/1074 347/10 |
| 7,707,887 B2 * | 5/2010 | Ohnishi | G01N 9/24 73/597 |
| 8,057,756 B2 * | 11/2011 | Londo | G01N 35/1009 422/501 |
| 8,778,686 B2 * | 7/2014 | Kuroda | G01N 35/1009 436/55 |
| 8,911,685 B2 * | 12/2014 | Watanabe | G01F 23/00 422/517 |
| 9,498,963 B2 | 11/2016 | Yamasaki et al. | |
| 9,821,552 B2 | 11/2017 | Yokoyama et al. | |
| 10,553,421 B2 | 2/2020 | Ishida et al. | |
| 2001/0045834 A1 | 11/2001 | Morikawa et al. | |
| 2006/0221142 A1 | 10/2006 | Katayama | |
| 2011/0063360 A1 | 3/2011 | Song et al. | |
| 2012/0007910 A1 | 1/2012 | Lee | |
| 2016/0375686 A1 | 12/2016 | Yokoyama et al. | |
| 2018/0065361 A1 | 3/2018 | Yokoyama et al. | |
| 2018/0085745 A1 | 3/2018 | Yokoyama et al. | |
| 2018/0085746 A1 | 3/2018 | Yokoyama et al. | |
| 2018/0085757 A1 | 3/2018 | Yokoyama et al. | |
| 2018/0086077 A1 | 3/2018 | Yokoyama et al. | |
| 2018/0088142 A1 | 3/2018 | Yokoyama et al. | |
| 2018/0169649 A1 | 6/2018 | Yokoyama et al. | |
| 2018/0272333 A1 | 9/2018 | Higuchi et al. | |
| 2018/0272334 A1 | 9/2018 | Higuchi et al. | |
| 2018/0272335 A1 | 9/2018 | Higuchi et al. | |
| 2018/0272345 A1 | 9/2018 | Higuchi et al. | |
| 2019/0059447 A1 | 2/2019 | Dubief et al. | |

FOREIGN PATENT DOCUMENTS

| | | |
|---|---|---|
| CN | 1935520 A | 3/2007 |
| CN | 103946364 A | 7/2014 |
| CN | 103974639 A | 8/2014 |
| CN | 105415886 A | 3/2016 |
| CN | 106158704 A | 11/2016 |
| JP | 2017015466 | 1/2017 |

OTHER PUBLICATIONS

U.S. Appl. No. 16/105,087, filed Aug. 20, 2018.
U.S. Appl. No. 16/104,976, filed Aug. 20, 2018.
U.S. Appl. No. 16/105,225, filed Aug. 20, 2018.
U.S. Appl. No. 16/105,134, filed Aug. 20, 2018.
Chinese Office Action dated Aug. 26, 2020, mailed in counterpart Chinese Application No. 201810803318.1, 19 pages (with translation).
Extended European Search Report dated Jan. 10, 2019, mailed in counterpart European Application No. 18189588.9, 12 pages.

* cited by examiner

LIQUID DISPENSING APPARATUS

CROSS-REFERENCE TO RELATED APPLICATION

This application is based upon and claims the benefit of priority from Japanese Patent Application No. 2017-159470, filed Aug. 22, 2017, the entire contents of which are incorporated herein by reference.

FIELD

Embodiments described herein relate generally to a liquid dispensing apparatus.

BACKGROUND

In a liquid dispensing apparatus, a liquid is dispensed through a liquid discharging device. The liquid discharging device can be detachable from the liquid dispensing apparatus so that it can be discarded after a single use to prevent contamination.

However, there is a problem in existing dispensing systems in that the discharging device might be reused or kept in service even though the discharging device is designed, or at least intended, only for single use.

DETAILED DESCRIPTION

In general, according to one embodiment, a liquid dispensing apparatus includes amounting unit on which a liquid discharging device is mounted, a driving circuit to supply driving voltages to an actuator of the liquid discharging device mounted on the mounting unit, a capacitance measuring circuit configured to measure a capacitance value of the actuator and a controller configured to acquire the capacitance value, compare the capacitance value to a predetermined threshold value, and determine whether to supply a first control signal to the driving circuit to drive the actuator of the liquid discharging device to discharge a liquid based on the comparison of the capacitance value to the predetermined threshold value.

Hereinafter, liquid dispensing apparatuses and liquid discharging devices according to certain example embodiments will be described with reference to the drawings. It should be noted, that the particular embodiments explained below are some possible examples of liquid dispensing apparatuses and chemical liquid discharging devices according to the present disclosure and do not limit the possible configurations, specifications, or the like of liquid dispensing apparatuses and liquid discharging devices according to the present disclosure. The drawings are schematic and are in some instances drawn with exaggeration and omissions for purposes of explanatory convenience. In general, components are not drawn to scale. The number of components, the dimensional ratio between different components, or the like does not necessarily match between different drawings or to actual devices.

First Embodiment

A discharging system according to a first embodiment discharges a liquid using a piezo jet method. For example, the discharging system discharges several picoliters (pL) to several microliters (μL) of a liquid into a microplate, a multi-well plate, or the like according to a user operation. For example, the discharging system is used in a laboratory in a technical field such as biology, chemistry, or pharmacy research.

Figure 1:
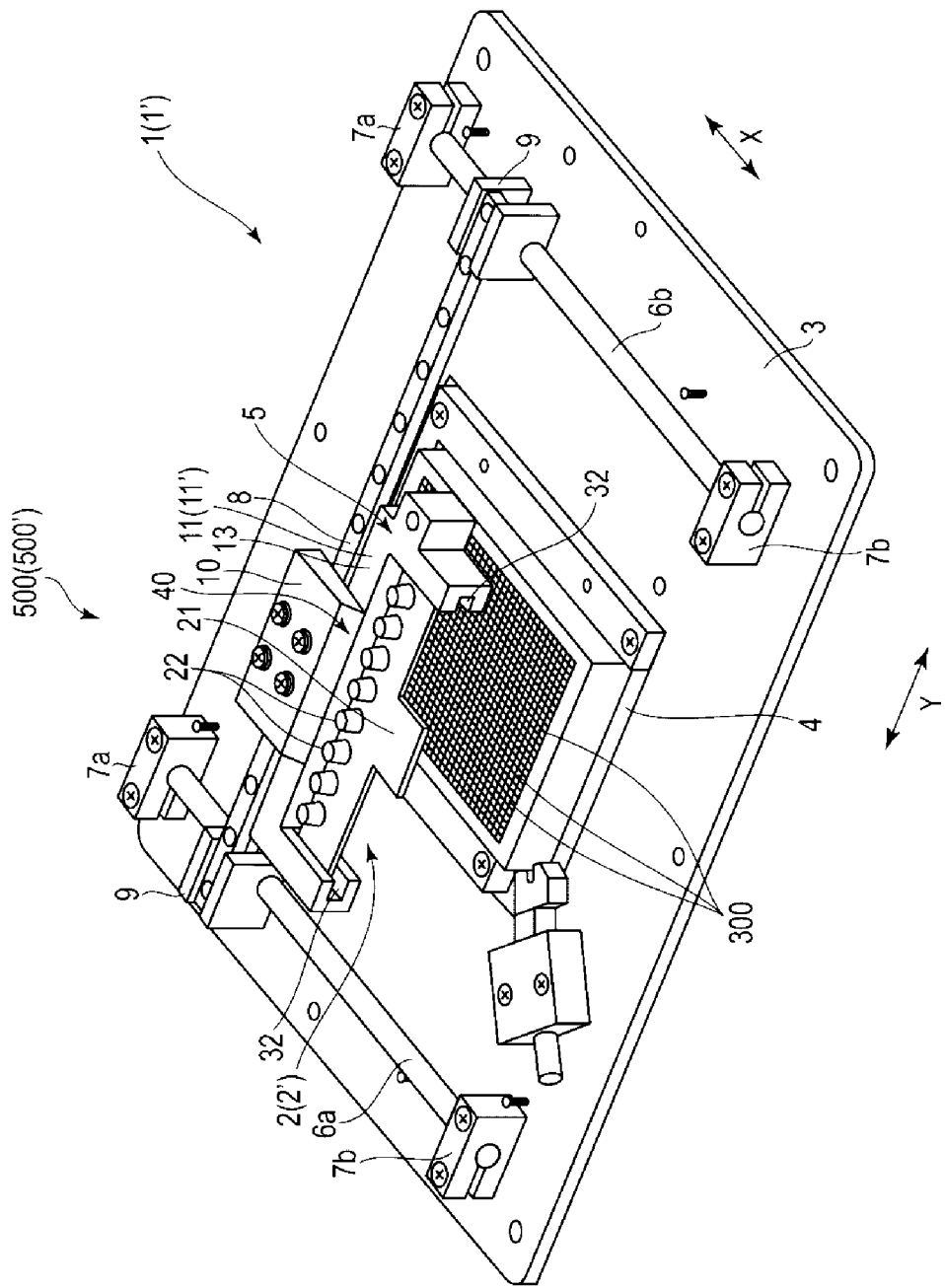
FIG. 1 is a schematic perspective view of a discharging system according to a first embodiment.
Figure 2:
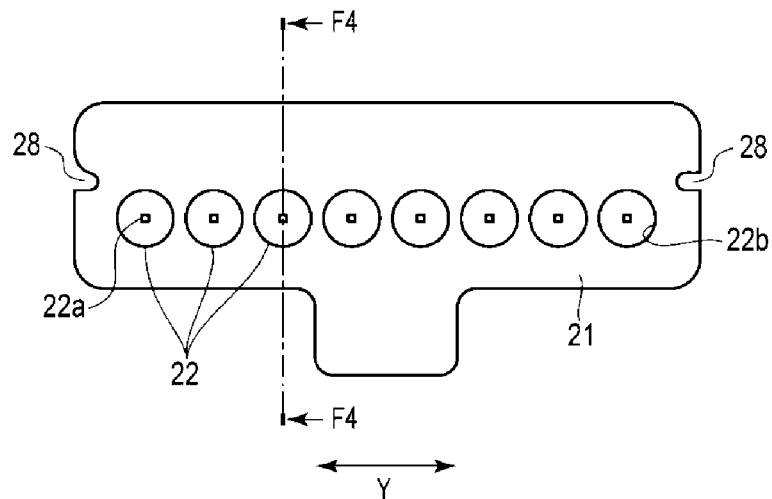
FIG. 2 is a top view of a liquid discharging device according to the first embodiment.
Figure 3:
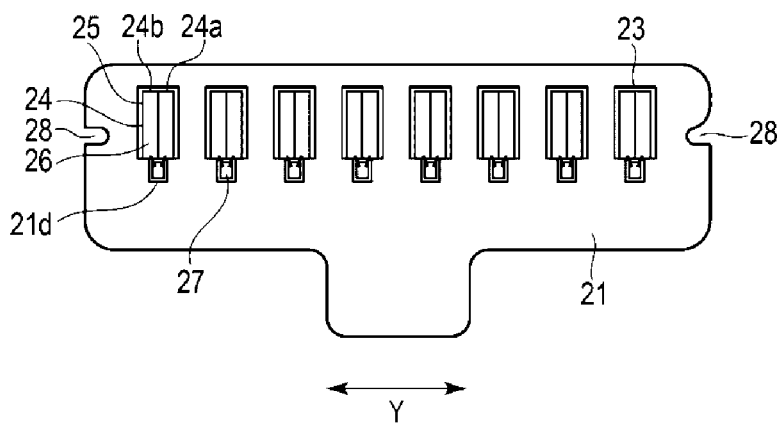
FIG. 3 is a bottom view of the liquid discharging device according to the first embodiment.
Figure 4:
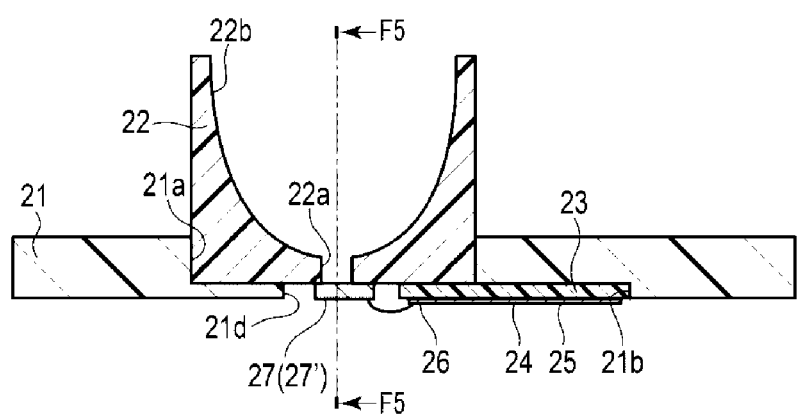
FIG. 4 is a cross-sectional view taken along a line F4-F4 of FIG. 2.
Figure 5:
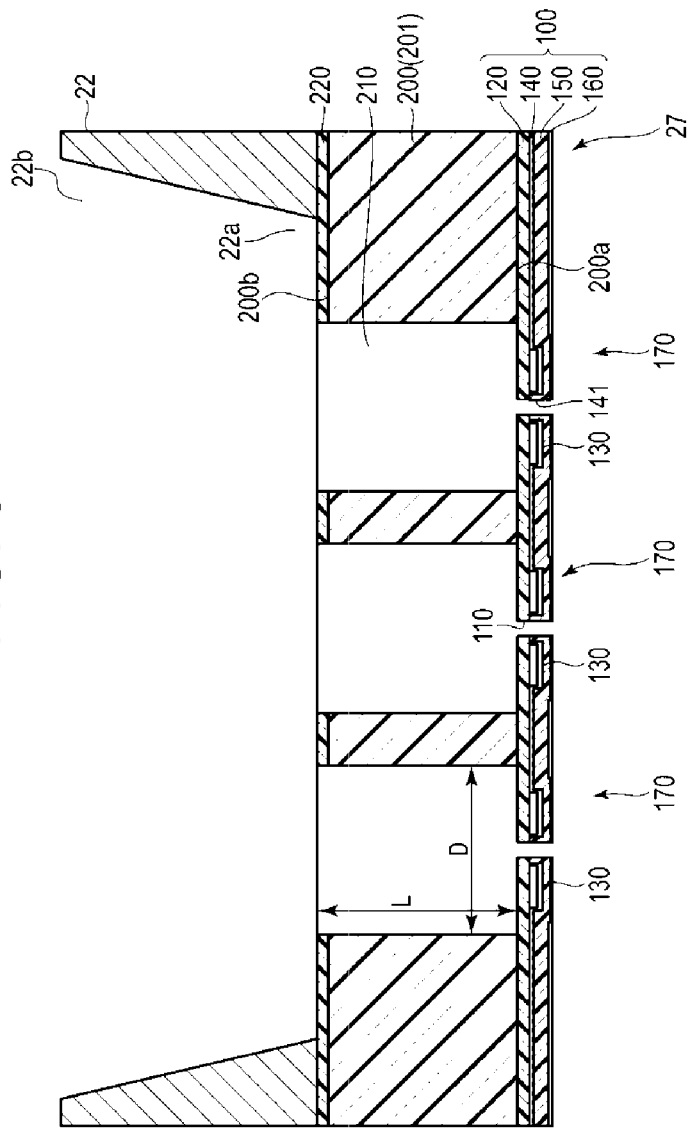
FIG. 5 is a cross-sectional view taken along a line F5-F5 of FIG. 4.

A configuration example of the discharging system according the first embodiment will be described with reference to FIGS. 1 to 5. FIG. 1 is a schematic perspective view of the discharging system 500. FIG. 2 is a top view of a chemical liquid discharging device 2. FIG. 3 is a bottom view of a surface of the chemical liquid discharging device 2 from which a liquid is discharged. FIG. 4 is a cross-sectional view taken along a line F4-F4 in FIG. 2. FIG. 5 is a cross-sectional view taken along a line F5-F5 in FIG. 4.

As shown in FIG. 1, the discharging system 500 includes a chemical liquid dispensing apparatus 1, the chemical liquid discharging device 2, a host computer 18 (also referred to as an external device), and the like. The discharging system 500 may have more elements in addition to the elements depicted in FIG. 1, or some of the elements depicted in FIG. 1 may be omitted in some embodiments.

The chemical liquid dispensing apparatus 1 controls the chemical liquid discharging device 2 to dispense a liquid from the chemical liquid discharging device 2.

The chemical liquid dispensing apparatus 1 includes a base 3 of a rectangular flat plate shape, and a mounting module 5 (also referred to as amounting unit) that mounts the chemical liquid discharging device 2. In the first embodiment, it is assumed that the chemical liquid dispensing apparatus 1 dispenses the chemical liquid into a microplate 4 having 1536 wells. Here, the front to rear direction of the base 3 is referred to as an X direction, and the right to left direction of the base 3 is referred to as a Y direction. The X direction and the Y direction are orthogonal.

The microplate 4 is fixed to the base 3. The microplate 4 includes a plurality of wells 300. Each well 300 of the microplate 4 holds a predetermined volume of a liquid. For example, the liquids in the microplate can be chemicals, reagents, solutions, solvents, or the like and/or may include cells, blood cells, bacteria, plasma, antibodies, DNA, nucleic acids or proteins.

The chemical liquid dispensing apparatus 1 includes a pair of right and left X direction guide rails 6a and 6b extending in the X direction on both sides of the microplate 4 on the base 3. Both ends each of the X direction guide rails 6a and 6b are fixed to fixing bases 7a and 7b protruding on the base 3.

A Y direction guide rail 8 extending in the Y direction is installed between the X direction guide rails 6a and 6b. Both ends of the Y direction guide rail 8 are fixed to an X direction moving base 9 that is slidable in the X direction along the X direction guide rails 6a and 6b, respectively.

The Y direction guide rail 8 includes a Y direction moving base 10 that allows a mounting module 5 to move in the Y direction along the Y direction guide rail 8. The mounting module 5 is mounted on the Y direction moving base 10. The chemical liquid discharging device 2 is fixed to the mounting module 5.

The chemical liquid discharging device 2 is supported so as to be movable to an arbitrary position in the XY directions orthogonal to each other by a combination of an operation of a movement in the Y direction moving base 10 along the Y direction guide rail 8 in the Y direction and an operation of a movement in the X direction moving base 9 along the X direction guide rails 6a and 6b in the X direction.

In the mounting module 5, a slit 32 for fixing the chemical liquid discharging device 2 is formed. When the chemical liquid discharging device 2 is inserted into the slit 32 from a front surface opening portion side of the slit 32, the chemical liquid discharging device 2 is fixed to the chemical liquid dispensing apparatus 1.

The mounting module 5 includes a driving circuit 11 and a capacitance measuring circuit 40. The driving circuit 11 and the capacitance measuring circuit 40 are described below.

The chemical liquid discharging device 2 discharges the liquid based on a control of the chemical liquid dispensing apparatus 1.

The chemical liquid discharging device 2 includes a base member 21 of a flat planar shape that is a plate of a rectangular plate shape. As shown in FIG. 2, a plurality of chemical liquid holding containers 22 is arranged in a row in the Y direction, on a surface side of the base member 21. In the first embodiment, eight chemical liquid holding containers 22 are included. However, the number is not limited to eight. As shown in FIG. 4, the chemical liquid holding container 22 is a container of a cylindrical shape having a bottom, of which a top surface is opened. A chemical liquid holding container recessed portion 21a of a cylindrical shape is formed at a position corresponding to each chemical liquid holding container 22, on the surface side of the base member 21.

The bottom portion of the chemical liquid holding container 22 is adhered and fixed to the recessed portion 21a. A bottom surface opening portion 22a serving as a liquid outlet port is formed at the center position on the bottom portion of the chemical liquid holding container 22. The opening area of a top surface opening portion 22b is larger than the opening area of the bottom surface opening portion 22a of the liquid outlet port.

At both ends of the base member 21, mount fixing notches 28 for mounting and fixing the mounting module 5 are formed respectively. The mount fixing notch 28 is engaged with the mounting module 5. Two notches 28 of the base member 21 are formed in a notch shape of a semi-length cylindrical shape. The mount fixing notch 28 may be a notch shape of a semi-circular shape, a semi-elliptical shape, a triangular shape, or the like. In the first embodiment, the shapes of the two notches 28 are different from each other. Therefore, the left and right shapes of the base member 21 are different, and it is easy to identify the posture of the base member 21.

As shown in FIG. 3, the same number of electrical substrate 23 as the chemical liquid holding container 22 are arranged in row in the Y direction, on a rear surface side of the base member 21. The electrical substrate 23 is a flat plate member of a rectangular shape. As shown in FIG. 4, an electrical substrate recessed portion 21b of a rectangular shape for mounting the electrical substrate 23 and a chemical liquid discharge array portion opening 21d connected with the electrical substrate recessed portion 21b are formed, on the rear surface side of the base member 21. A base end portion of the electrical substrate recessed portion 21b extends to the vicinity of an upper end portion of the base member 21 in FIG. 3 (the position in the vicinity of the right end portion in FIG. 4). As shown in FIG. 4, a distal end portion of the electrical substrate recessed portion 21b extends to a position overlapping a portion of the chemical liquid holding container 22. The electrical substrate 23 is adhered and fixed to the electrical substrate recessed portion 21b.

An electrical substrate wiring 24 is patterned and formed on a surface opposite to an adhesive fixing surface of the electrical substrate recessed portion 21b, on the electrical substrate 23. Wiring patterns 24a and 24b respectively connected to a driving element 130 are formed on the electrical substrate wiring 24.

A control signal input terminal 25 for inputting an electrical signal (also referred to as a driving signal) from the driving circuit 11 is formed at one end portion of the electrical substrate wiring 24. An electrode terminal connection portion 26 is provided at the other end portion of the electrical substrate wiring 24.

The base member 21 is provided with the chemical liquid discharge array portion opening 21d. As shown in FIG. 3, the chemical liquid discharge array portion opening 21d is formed at a position overlapping with the chemical liquid holding container recessed portion 21a on the rear surface side of the base member 21, in an opening portion of a rectangular shape.

A chemical liquid discharge array 27 is adhered and fixed to the bottom surface of the chemical liquid holding container 22 with the chemical liquid discharge array 27 covering the bottom surface opening portion 22a of the chemical liquid holding container 22. The chemical liquid discharge array 27 is disposed at a position corresponding to the chemical liquid discharge array portion opening 21d of the base member 21.

As shown in FIG. 5, the chemical liquid discharge array 27 is formed by laminating a nozzle plate 100 and a pressure chamber structure 200. The nozzle plate 100 includes a nozzle 110 that discharges the liquid, a diaphragm 120, the driving element 130 that is a driving unit, an insulation film 140 that insulates the driving element 130, a protection film 150 that is protection layer, a liquid repellant film 160. An actuator 170 includes the diaphragm 120 and the driving element 130. For example, a plurality of nozzles 110 is arranged in 3×3 rows. The plurality of nozzles 110 is positioned inside the bottom surface opening portion 22a of the liquid outlet port of the chemical liquid holding container 22. The chemical liquid holding container 22, the pressure chamber structure 200, the actuator 170, and the like form a discharging portion that discharges the liquid.

For example, the diaphragm 120 is integrated with the pressure chamber structure 200. If a heat treatment is performed on a silicon wafer 201 in an oxygen atmosphere, a $SiO_2$ (silicon oxide) film is formed on the surface of the silicon wafer 201. The diaphragm 120 uses the $SiO_2$ film of the surface of the silicon wafer 201. The diaphragm 120 may be formed by depositing the $SiO_2$ film on the surface of the silicon wafer 201 by a CVD (Chemical Vapor Deposition) method.

The film thickness of the diaphragm 120 is preferably in a range of 1 to 30 μm. The diaphragm 120 may use a semiconductor material such as SiN (silicon nitride), $Al_2O_3$ (aluminum oxide), or the like, instead of the $SiO_2$ film.

The driving element 130 is formed in each nozzle 110. The driving element 130 is an annular shape surrounding the nozzle 110. The shape of the driving element 130 is not limited, and may be, for example, a C shape in which a portion of the circular ring is cut out.

The driving element 130 is electrically connected to the electrode terminal connection portion 26. That is, one surface of the driving element 130 is electrically connected to the wiring pattern 24a. The other surface of the driving element 130 is electrically connected to the wiring pattern 24b.

The driving element 130 is driven by a voltage difference between the voltage applied to the wiring pattern 24a and the voltage applied to the wiring pattern 24b.

The driving element 130 includes a piezoelectric film that is a piezoelectric material, and uses PZT (Pb (Zr, Ti) $O_3$: lead zirconate titanate). For example, a piezoelectric film included in the driving element 130 may use a piezoelectric material such as PTO ($PbTiO_3$: lead titanate), PMNT (Pb $(Mg_{1/3}Nb_{2/3})O_3$—$PbTiO_3$), PZNT (Pb $(Zn_{1/3}Nb_{2/3})O_3$—$PbTiO_3$), KNN (a compound of $KNbO_3$ and $NaNbO_3$), ZnO, and AlN may be used.

The piezoelectric film included in the driving element 130 generates a polarization in the thickness direction. If an electric field in the same direction as the polarization is applied to the driving element 130, the driving element 130 extends or contracts in a direction orthogonal to the electric field direction. That is, the driving element 130 contracts or extends in a direction orthogonal to the film thickness.

The nozzle plate 100 includes the protection film 150. The protection film 150 includes a chemical liquid passage portion 141 of a cylindrical shape that is connected to the nozzle 110 of the diaphragm 120.

The nozzle plate 100 includes the liquid repellant film 160 that covers the protection film 150. For example, the liquid repellant film 160 is formed by spin-coating, for example, a silicone resin having a characteristic of repelling a chemical liquid. The liquid repellant film 160 may also be formed by a fluorinated resin material or the like.

The pressure chamber structure 200 includes a warp reduction film 220 that is a warp reduction layer on a surface opposite to the diaphragm 120. The pressure chamber structure 200 includes a pressure chamber 210 that penetrates the warp reduction film 220, is positioned at the position of the diaphragm 120, and is connected to the nozzle 110. For example, the pressure chamber 210 is formed in a circular shape positioned in the same axis as the nozzle 110.

The pressure chamber 210 includes an opening portion connected to the bottom surface opening portion 22a of the chemical liquid holding container 22. It is preferable that the size L in the depth direction of the opening portion of the pressure chamber 210 is larger than the size D in the width direction of the opening portion of the pressure chamber 210. The size L in the depth direction is set to be larger than the size D in the width direction. Therefore, the pressure applied to the liquid in the pressure chamber 210 may delay an escape to the chemical liquid holding container 22 by a vibration of the diaphragm 120 of the nozzle plate 100.

In the pressure chamber structure 200, the side on which the diaphragm 120 of the pressure chamber 210 is disposed is referred to a first surface 200a and the side on which the warp reduction film 220 is disposed is referred to a second surface 200b. The chemical liquid holding container 22 is adhered to the side of the warp reduction film 220 of the pressure chamber structure 200 by, for example, an epoxy type adhesive. The pressure chamber 210 of the pressure chamber structure 200 is connected to the bottom surface opening portion 22a of the chemical liquid holding container 22 by an opening portion of the side of the warp reduction film 220.

The diaphragm 120 deforms in the thickness direction by an operation of the driving element 130 of a surface shape. The chemical liquid discharging device 2 discharges the liquid supplied to the nozzle 110 by a pressure change generated in the pressure chamber 210 of the pressure chamber structure 200 due to the deformation of the diaphragm 120.

The driving circuit 11 drives the chemical liquid discharging device 2 based on a signal from a processor 15 (also referred to as a controller). For example, the driving circuit 11 supplies a signal, electric power, or the like to the chemical liquid discharging device 2 to discharge the liquid from the chemical liquid discharging device 2. That is, the driving circuit 11 applies voltages to the wiring patterns 24a and 24b connected to the driving element 130 of the chemical liquid discharging device 2.

The driving circuit 11 supplies a discharge voltage in the same direction as the polarization direction of the driving element 130 to discharge the liquid. That is, the driving circuit 11 supplies a voltage in a direction to enhance polarization of the driving element 130. For example, the driving circuit 11 connects the positive polarization side of the driving element 130 to GND and applies a negative voltage to the negative polarization side of the driving element 130. The driving circuit 11 may connect the negative polarization side of the driving element 130 to GND and apply a positive voltage to the positive polarization side of the driving element 130.

The driving circuit 11 connects the wiring patterns 24a and 24b, and the capacitance measuring circuit 40 based on a signal from the processor 15. That is, the driving circuit 11 connects the driving element 130 and the capacitance measuring circuit 40 so that the capacitance measuring circuit 40 can measure the capacitance of the driving element 130.

The capacitance measuring circuit 40 measures the capacitance of the connected configuration. The capacitance measuring circuit 40 is connected to the driving element 130 of the chemical liquid discharging device 2 through the driving circuit 11. The capacitance measuring circuit 40 measures the capacitance of the driving element 130.

The capacitance measuring circuit 40 transmits the measured capacitance to the processor 15.

For example, the capacitance measuring circuit 40 measures the capacitance by measuring the impedance of the connected configuration. The capacitance measuring circuit 40 may transmit the measured impedance to the processor 15. The method of measuring the capacitance by the capacitance measuring circuit 40 is not limited to any specific method.

Next, a control system of the discharging system 500 will be described.

As described above, the discharging system 500 includes the chemical liquid dispensing apparatus 1, the chemical liquid discharging device 2, the host computer 18, and the like.

The host computer 18 controls the chemical liquid dispensing apparatus 1 according to a user operation. The host computer 18 includes an operation unit 18a, a display unit 18b, and the like. The host computer 18 includes a processor, a RAM, a ROM, a non-volatile memory (NVM), and the like.

The operation unit 18a receives an operation instruction from the user. For example, the operation unit 18a is a keyboard, a mouse, a touch panel, or the like.

The display unit 18b displays various kinds of information by a control of the processor 15. For example, the display unit 18b includes a liquid crystal display. If the operation unit 18a includes a touch panel or the like, the display unit 18b may be formed integrally with the operation unit 18a.

The host computer 18 receives various inputs through the operation unit 18a. For example, the host computer 18 receives an input indicating that the chemical liquid holding container 22 has been filled with a liquid. The host computer 18 receives an input selection for discharging the liquid from the chemical liquid holding container 22.

When the host computer 18 receives the input selection for discharging the liquid from the chemical liquid holding container 22, the host computer 18 transmits a discharge signal for discharging the liquid to the chemical liquid dispensing apparatus 1.

The host computer 18 may receive inputs for each chemical liquid holding container 22. For example, the host computer 18 may receive an input indicating that the filling has been completed and discharging has been instructed separately for each chemical liquid holding container 22.

Figure 6:
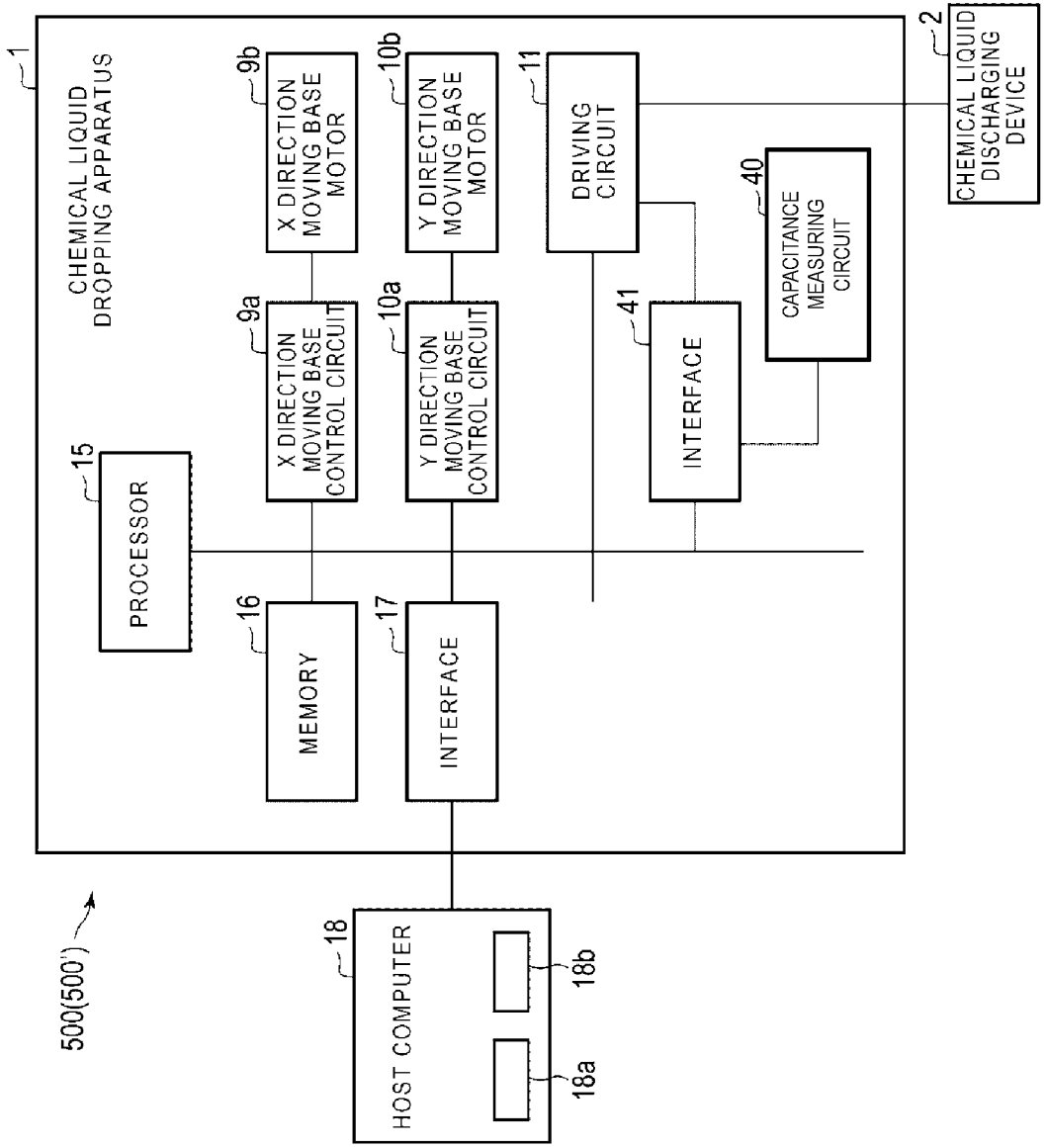
FIG. 6 is a block diagram of a control system of the discharging system according to the first embodiment.

As shown in FIG. 6, the chemical liquid dispensing apparatus 1 includes an X direction moving base control circuit 9a, an X direction moving base motor 9b, a Y direction moving base control circuit 10a, a Y direction moving base motor 10b, the driving circuit 11, the processor 15, a memory 16, an interface 17, the capacitance measuring circuit 40, the interface 41, and the like. Such units are connected to each other through a data bus. The chemical liquid dispensing apparatus 1 may have more elements in addition to the elements depicted in FIG. 6, or some of the elements depicted in FIG. 6 may be omitted in some embodiments.

The processor 15 has a function of controlling all operations of the chemical liquid dispensing apparatus 1. The processor 15 may include an internal cache, various interfaces, and the like. The processor 15 realizes various processes by executing a program stored in advance in the internal cache, the memory 16, or the like.

Some of the various functions realized by the execution of the program by the processor 15 may be realized by a hardware circuit. In this case, the processor 15 controls a function executed by the hardware circuit.

The memory 16 stores various data. For example, the memory 16 stores a control program, a control data, and the like. The control program and the control data are incorporated in advance according to a specification of the chemical liquid dispensing apparatus 1. The control program is a program or the like supporting the function realized by the chemical liquid dispensing apparatus 1.

The memory 16 temporarily stores data or the like under processing of the processor 15. The memory 16 may store data necessary for executing an application program, an execution result of the application program, and the like.

The interface 17 (also referred to as a communication unit) is an interface for transmitting and receiving data to and from the host computer 18. For example, the interface 17 is connected to the host computer 18 through a wired or wireless line. For example, the interface 17 may support a LAN connection, a USB connection, or a Bluetooth® (connection.

The X direction moving base control circuit 9a drives the X direction moving base motor 9b based on a signal from the processor 15. The X direction moving base control circuit 9a drives the X direction moving base motor 9b by supplying a signal or electric power to the X direction moving base motor 9b.

The X direction moving base motor 9b moves the X direction moving base 9 in the X direction. For example, the X direction moving base motor 9b is connected to the X direction moving base 9 through a gear or the like and moves the X direction moving base 9 in the X direction.

The Y direction moving base control circuit 10a drives the Y direction moving base motor 10b based on a signal from the processor 15. The Y direction moving base control circuit 10a drives the Y direction moving base motor 10b by supplying a signal or electric power to the Y direction moving base motor 10b.

The Y direction moving base motor 10b moves the Y direction moving base 10 in the Y direction. For example, the Y direction moving base motor 10b is connected to the Y direction moving base 10 through a gear or the like and moves the Y direction moving base 10 in the Y direction.

The interface 41 is an interface for connecting the capacitance measuring circuit 40 and the driving circuit 11. For example, the interface 41 is a connection terminal or the like. Note that, the interface 41 may further connect the capacitance measuring circuit 40 and the processor 15.

The chemical liquid discharging device 2, the driving circuit 11, and the capacitance measuring circuit 40 are as described above.

Next, the function realized by the processor 15 of the chemical liquid dispensing apparatus 1 will be described. The following function is realized by the processor 15 executing the program stored in the memory 16 or the like.

First, the processor 15 has a function of acquiring the capacitance of the driving element 130 of the chemical liquid discharging device 2.

The processor 15 determines whether the chemical liquid discharging device 2 has been set in the mounting module 5. For example, the processor 15 determines whether the chemical liquid discharging device 2 has been set in the mounting module 5 according to a signal from a sensor (not specifically depicted).

Once it has been determined that the chemical liquid discharging device 2 has been set in the mounting module 5, the processor 15 causes the capacitance measuring circuit 40 to measure the capacitance of the driving element 130.

For example, the processor 15 transmits a signal to the driving circuit 11 to connect the driving element 130 and the capacitance measuring circuit 40. The processor 15 acquires the capacitance measured by the capacitance measuring circuit 40.

The processor 15 acquires the capacitance of each driving element 130 corresponding to each chemical liquid holding container 22.

Figure 7:
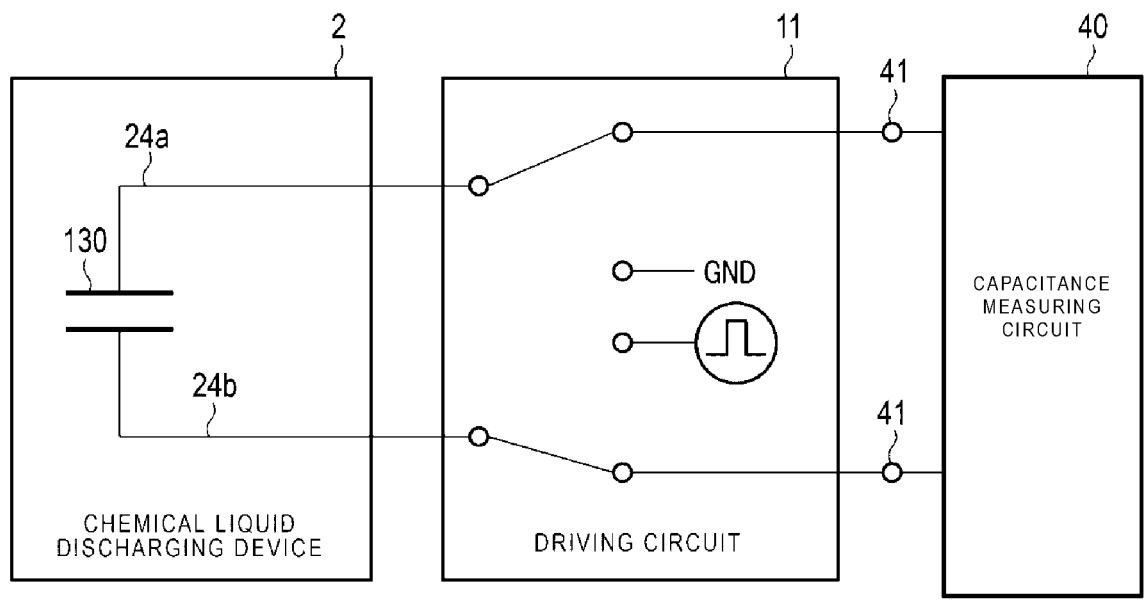
FIG. 7 is a diagram of a connection example of a driving circuit according to the first embodiment.

FIG. 7 is a diagram of an example of the connection relationship when the capacitance measuring circuit 40 measures the capacitance of the driving element 130.

As shown in FIG. 7, the capacitance measuring circuit 40 is connected to the driving element 130 through the interface 41 and the driving circuit 11. The capacitance measuring circuit 40 is electrically connected to the wiring patterns 24a and 24b. The capacitance measuring circuit 40 measures the capacitance of the driving element 130 between the wiring pattern 24a and the wiring pattern 24b.

The processor 15 has a further function of determining whether the chemical liquid discharging device 2 has been previously used based on the acquired capacitance value.

The processor 15 can determine whether the driving element 130 has been operated (referred to as an operation state) based on the capacitance.

As described above, the driving circuit 11 supplies a discharge voltage in the same direction as the polarization direction of the driving element 130 to discharge the liquid. As a result, polarization of the driving element 130 is enhanced by the discharge process, and the capacitance of the driving element 130 increases. Therefore, the capacitance of the driving element 130 increases due to the discharge operation and the particular capacitance state of a driving element 130 can be used as an indication of the operation state (used/unused state) of the driving element 130.

Therefore, when the acquired capacitance is greater than the threshold value, the processor 15 determines that the driving element 130 has been operated. As the threshold value, for example, the capacitance at a frequency of 10 kHz is 240 pF. The threshold value can be appropriately set according to drive element 130 type.

When the acquired capacitance is equal to or less than the threshold value, the processor 15 determines that the driving element 130 has not been operated.

The processor 15 can determine the operating state of each driving element 130.

The processor 15 determines whether the chemical liquid discharging device 2 has been previously used, based on the determined operation state of each driving element 130.

For example, when at least one driving element 130 has been operated, the processor 15 determines that the chemical liquid discharging device 2 has been previously used. When any of the driving elements 130 has not been operated, the processor 15 determines that the chemical liquid discharging device 2 has not been used (that is, unused).

The processor 15 has a function of discharging the liquid from the chemical liquid discharging device 2 based on the determination result of whether the chemical liquid discharging device 2 has been previously used.

When the chemical liquid discharging device 2 has not been used, the processor 15 discharges the liquid from the chemical liquid discharging device 2.

For example, the user supplies a predetermined amount of the liquid to the chemical liquid holding container 22 from the top surface opening portion 22b of the chemical liquid holding container 22 by a pipette or the like. The liquid is held inside the chemical liquid holding container 22. The bottom surface opening portion 22a of the bottom portion of the chemical liquid holding container 22 is connected to the chemical liquid discharge array 27. The liquid in the chemical liquid holding container 22 is filled in each pressure chamber 210 of the chemical liquid discharge array 27 through the bottom surface opening portion 22a of the bottom surface of the chemical liquid holding container 22.

The liquid in the chemical liquid discharging device 2 includes any of, for example, a low molecular weight compound, a fluorescent reagent, a protein, an antibody, a nucleic acid, a plasma, a bacteria, a blood cell or a cell. In general, a main solvent in the liquid (substance having the largest weight ratio of volume ratio) is water, glycerin, or dimethylsulfoxide.

The user inputs an operation instruction for discharging the liquid to the operation unit 18a of the host computer 18. The user may input the operation instruction for discharging the liquid from a specific chemical liquid holding container 22.

If the host computer 18 receives the operation instruction for discharging the liquid, the host computer 18 transmits a discharge signal instructing the discharge of the chemical liquid with respect to the chemical liquid dispensing apparatus 1. The discharge signal may be an instruction of the discharge of the chemical liquid from a specific chemical liquid holding container 22.

The processor 15 receives the discharge signal through the interface 17. If the chemical liquid discharging device 2 has not been used, the processor 15 causes the chemical liquid discharging device 2 to discharge the liquid based on the discharge signal.

The processor 15 controls the X direction moving base motor 9b and the Y direction moving base motor 10b to move the chemical liquid discharging device 2 set in the mounting module 5 to a predetermined position. For example, the processor 15 moves the chemical liquid discharging device 2 to a position where the plurality of nozzles 110 is inserted into a well 300. The processor 15 may move the chemical liquid discharging device 2 to the predetermined position according to the discharge signal.

If the chemical liquid discharging device 2 is moved to the predetermined position, the processor 15 applies a discharge voltage in a polarization direction to the driving element 130 using the driving circuit 11 for discharging the liquid.

The processor 15 transmits a signal to the driving circuit 11, and a voltage control signal is input from the driving circuit 11 to the driving element 130 as a driving power. In response to the application of the voltage control signal, the driving element 130 deforms the diaphragm 120 to change the volume of the pressure chamber 210. Therefore, the liquid is discharged as a droplet from the nozzle 110 of the chemical liquid discharge array 27. As a result, the chemical liquid discharging device 2 dispenses a predetermined amount of liquid from the nozzle 110 to the well 300 of the microplate 4.

To dispense the predetermined amount of liquid to each well 300 of the microplate 4, the processor 15 repeats an operation of transmitting a signal to the X direction moving base control circuit 9a, the Y direction moving base control circuit 10a, and the driving circuit 11.

The number of times and the position at which the processor 15 discharges the liquid is not limited to a specific configuration.

If it is determined that the chemical liquid discharging device 2 has not been used, the processor 15 may transmit a signal indicating that the chemical liquid discharging device 2 has not been used to the host computer 18. The host computer 18 may display that the chemical liquid discharging device 2 has not been used on the display unit 18b or the like, based on the corresponding signal.

Figure 8:
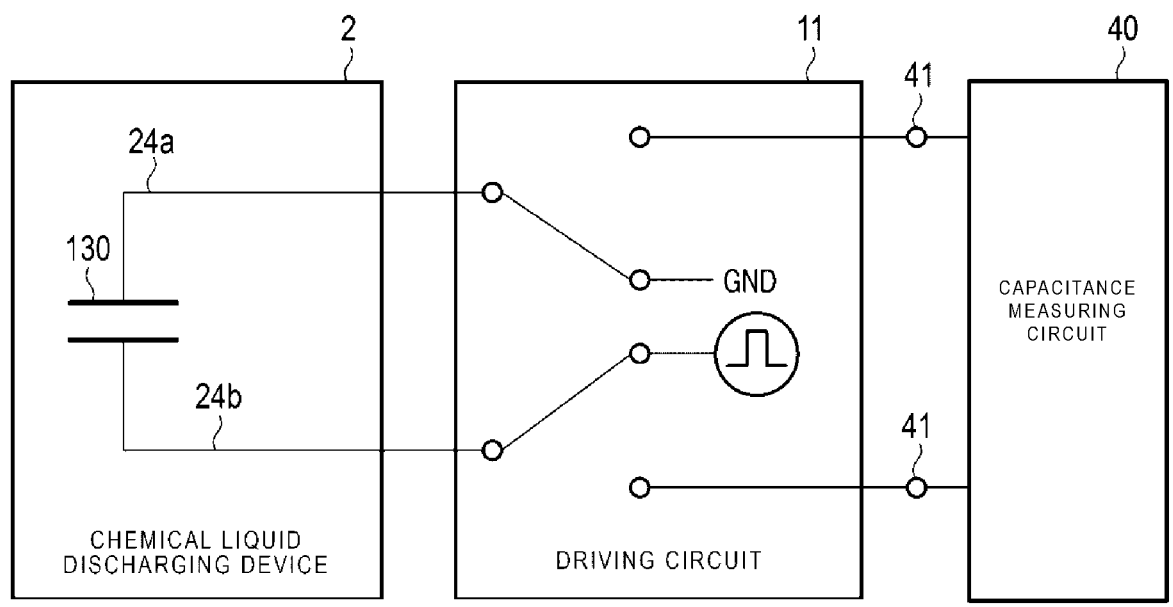
FIG. 8 is a diagram of a connection example of a driving circuit according to the first embodiment.

FIG. 8 is a diagram of an example of the connection relationship when the processor 15 performs the discharge operation using the driving circuit 11.

As shown in FIG. 8, the driving circuit 11 is connected to the driving element 130. The driving circuit 11 is electrically connected to the wiring patterns 24a and 24b. The wiring pattern 24a is connected to GND. The wiring pattern 24b is connected to the electric power output unit of the driving circuit 11.

The driving circuit 11 applies a voltage to the wiring pattern 24b based on the signal from the processor 15 and applies the discharge voltage to the driving element 130.

If it is determined that the chemical liquid discharging device 2 has been previously used, the processor 15 does not discharge the liquid from the chemical liquid discharging device 2.

For example, if the chemical liquid discharging device 2 has been previously used, the processor 15 does not discharge the liquid even if the processor 15 receives the discharge signal. The processor 15 transmits a signal indicating that the chemical liquid discharging device 2 has been previously used to the host computer 18 through the interface 17.

If the host computer 18 receives the corresponding signal, the host computer 18 displays a warning or the like indicating that the chemical liquid discharging device 2 has been previously used on the display unit 18b or the like.

Next, an operation example of the processor 15 of the chemical liquid dispensing apparatus 1 will be described.

Figure 9:
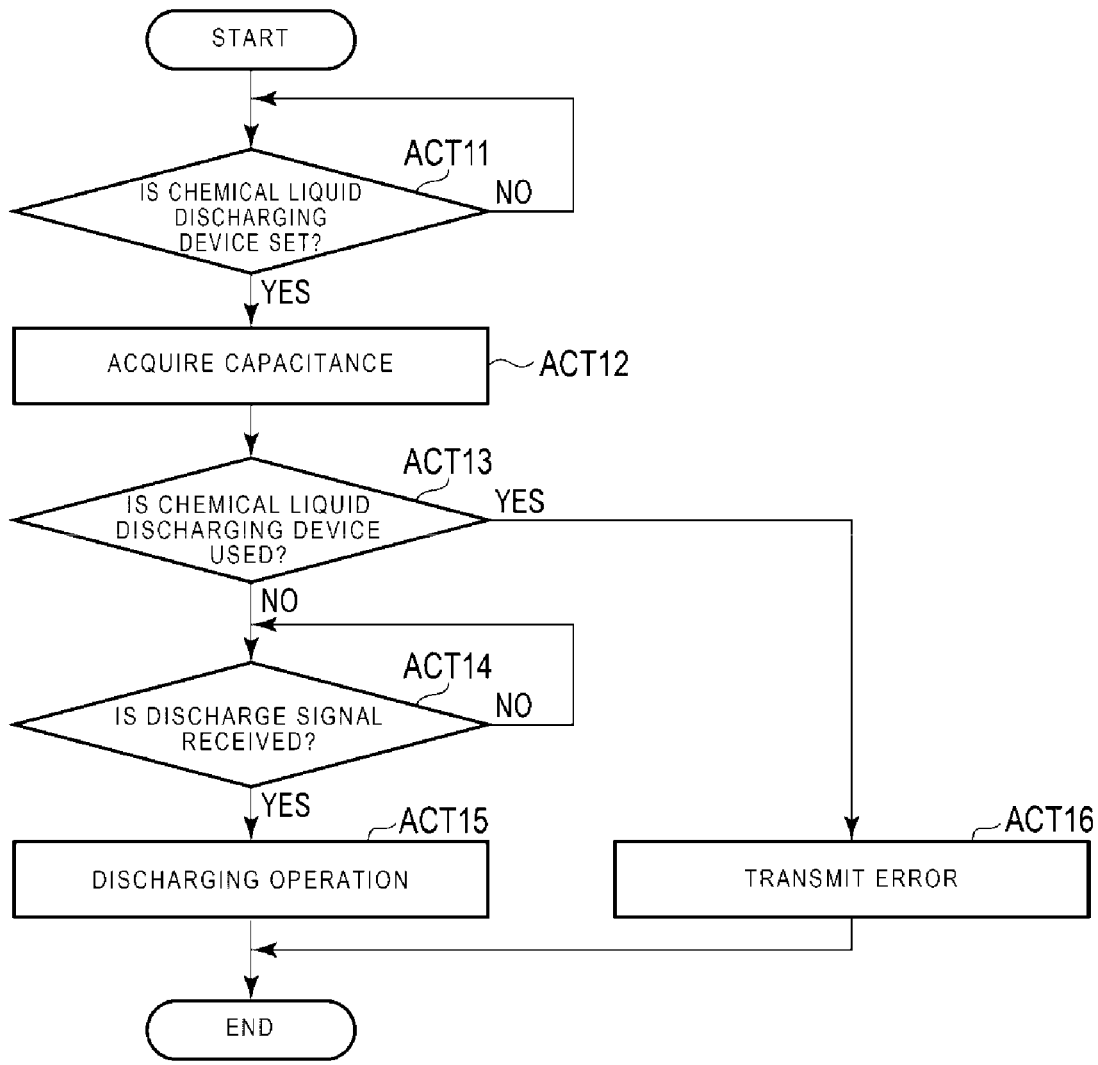
FIG. 9 is a flowchart showing an operation example of a liquid dispensing apparatus according to the first embodiment.

FIG. 9 is a flowchart for describing an operation example of the processor 15 of the chemical liquid dispensing apparatus 1.

First, the processor 15 determines whether the chemical liquid discharging device 2 is set in the mounting module 5 (ACT 11). When it is determined that the chemical liquid discharging device 2 is not set in the mounting module 5 (ACT 11, NO), the processor 15 returns to ACT 11.

When it is determined that the chemical liquid discharging device 2 is set in the mounting module 5 (ACT 11, YES), the processor 15 acquires (e.g., causes to be measured) the capacitance of each driving element 130 (ACT 12). Upon acquiring the capacitance of each driving element 130, the processor 15 determines whether the chemical liquid discharging device 2 has been previously used based on the capacitance of each driving element 130 (ACT 13).

When it is determined that the chemical liquid discharging device 2 has not been used (is previously unused) (ACT 13, NO), the processor 15 determines whether or not the discharge signal has been received through the interface 17 (ACT 14). When it is determined that the discharge signal has not been received through the interface 17 (ACT 14, NO), the processor 15 returns to ACT 14.

When it is determined that the discharge signal has been received through the interface 17 (ACT 14, YES), the processor 15 causes the chemical liquid discharging device 2 to discharge the liquid according to the discharge signal (ACT 15).

When it is determined that the chemical liquid discharging device 2 has been previously used according to the use history (ACT 13, YES), the processor 15 transmits the signal indicating that the chemical liquid discharging device 2 has been previously used (that is, an error message) to the host computer 18 through the interface 17 (ACT 16).

If the chemical liquid discharging device 2 discharges the liquid according to the discharge signal (ACT 15), or if the signal indicating that the chemical liquid discharging device 2 has been previously used is transmitted to the host computer 18 (ACT 16), the processor 15 ends the operation.

The processor 15 may determine whether each chemical liquid holding container 22 of the chemical liquid discharging device 2 has been previously used. For example, the processor 15 determines that the chemical liquid holding container 22 connected to the operated driving element 130 has been used.

Once it is determined whether each chemical liquid holding container 22 has been previously used, the processor 15 receives the discharge signal from the host computer 18 at a predetermined timing. The discharge signal instructs the discharge of the liquid from a chemical liquid holding container 22. If the chemical liquid holding container 22 that discharges the liquid has not been used, the processor 15 discharges the liquid from the chemical liquid holding container 22 according to the discharge signal.

If the chemical liquid holding container 22 that discharges the liquid has been previously used, the processor 15 will not perform the discharge operation even when the processor 15 receives the discharge signal. In this case, the processor 15 may transmit a signal indicating that the corresponding chemical liquid holding container 22 has been previously used to the host computer 18.

The discharging system can measure the capacitance of a piezoelectric film of the liquid discharging device. The discharging system may then determine whether the driving element 130 has been operated based on capacitance measurements. The discharging system checks whether the liquid discharging device has been previously used based on the condition (capacitance state) of the driving element 130. The discharging system does not discharge the liquid from the liquid discharging device if the liquid discharging device has been previously used.

As a result, the discharging system can prevent the discharge of a liquid via the reuse of a liquid discharging device that has been previously used.

Second Embodiment

A discharging system 500' according to a second embodiment is different from that of the first embodiment in that the chemical liquid discharging device 2 discharges the liquid, and then a voltage in a reverse direction of the discharge voltage is applied to the driving element 130. The same reference numerals are used for the components that are substantially the same as those of the first embodiment, and detailed descriptions of repeated components may be omitted.

The discharging system 500' according to the second embodiment includes a chemical liquid dispensing apparatus 1'.

The chemical liquid dispensing apparatus 1' includes a driving circuit 11' in place of the driving circuit 11.

The driving circuit 11' further has a function described below in addition to the function that the driving circuit 11 has.

The driving circuit 11' applies a reverse voltage. That is, the driving circuit 11' applies a voltage in a direction to reduce the polarization of the driving element 130. For example, the driving circuit 11' connects the positive polarization side of the driving element 130 to GND and applies a positive voltage to the negative polarization side of the driving element 130. Likewise, the driving circuit 11' may connect the negative polarization side of the driving element 130 to GND and apply a negative voltage to the positive polarization side of the driving element 130.

The magnitude of the reverse voltage may be equal to or different from the magnitude of the discharge voltage.

Next, the function realized by the processor 15 of the chemical liquid dispensing apparatus 1' will be described.

The following function is realized by the processor 15 executing the program stored in the memory 16 or the like.

First, the processor 15 has a function of acquiring capacitance of the driving element 130 of the chemical liquid discharging device 2.

A method of measuring the capacitance of the driving element 130 by the processor 15 is the same as that of the first embodiment, and the description thereof will not be repeated.

Figure 10:
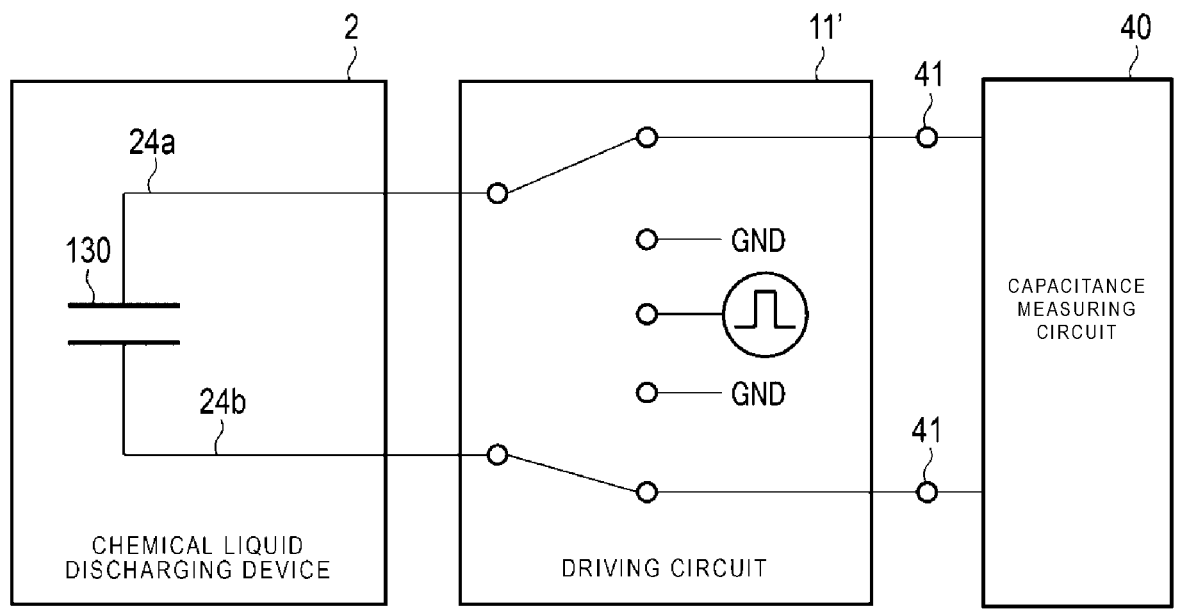
FIG. 10 is a diagram of a connection example of a driving circuit according to a second embodiment.

FIG. 10 is a diagram of an example of the connection relationship when the capacitance measuring circuit 40 measures the capacitance of the driving element 130.

As shown in FIG. 10, the capacitance measuring circuit 40 is connected to the driving element 130 through the interface 41 and the driving circuit 11'. The capacitance measuring circuit 40 is electrically connected to the wiring patterns 24a and 24b. The capacitance measuring circuit 40 measures the capacitance of the driving element 130 between the wiring pattern 24a and the wiring pattern 24b.

The processor 15 has a function of determining whether the chemical liquid discharging device 2 has been previously used, based on the acquired capacitance.

The processor 15 determines whether the driving element 130 has been operated (that is an operation state) based on the measured capacitance value.

Once the discharging of the liquid has been completed, the driving circuit 11' supplies a reverse voltage (a voltage having a polarization in the direction opposite to the polarization direction of the driving element 130) to the driving element 130. That is, the driving element 130 is reverse polarized with respect to the applied voltage at this time. As a result, the capacitance of the driving element 130 is reduced.

Therefore, when the acquired capacitance is smaller than the threshold value, the processor 15 determines that the driving element 130 has been previously operated.

When the acquired capacitance is equal to or greater than the threshold value, the processor 15 determines that the driving element 130 has not been operated.

The processor 15 can determine the operation state of each driving element 130.

The processor 15 determines whether the chemical liquid discharging device 2 has been previously used, based on the operation state of each driving element 130.

For example, when at least one driving element 130 has been operated, the processor 15 determines that the chemical liquid discharging device 2 has been previously used. When none of the driving element 130 has been previously operated, the processor 15 determines that the chemical liquid discharging device 2 has not been used (that is, unused).

The processor 15 has a function of discharging the liquid from the chemical liquid discharging device 2 based on the determination of whether the chemical liquid discharging device 2 has been previously used.

When the chemical liquid discharging device 2 has not been used, the processor 15 discharges the liquid from the chemical liquid discharging device 2. The operation in which the processor 15 causes the chemical liquid discharging device 2 to discharge the liquid is the same as in the first embodiment, and the explanation thereof will not be repeated.

Figure 11:
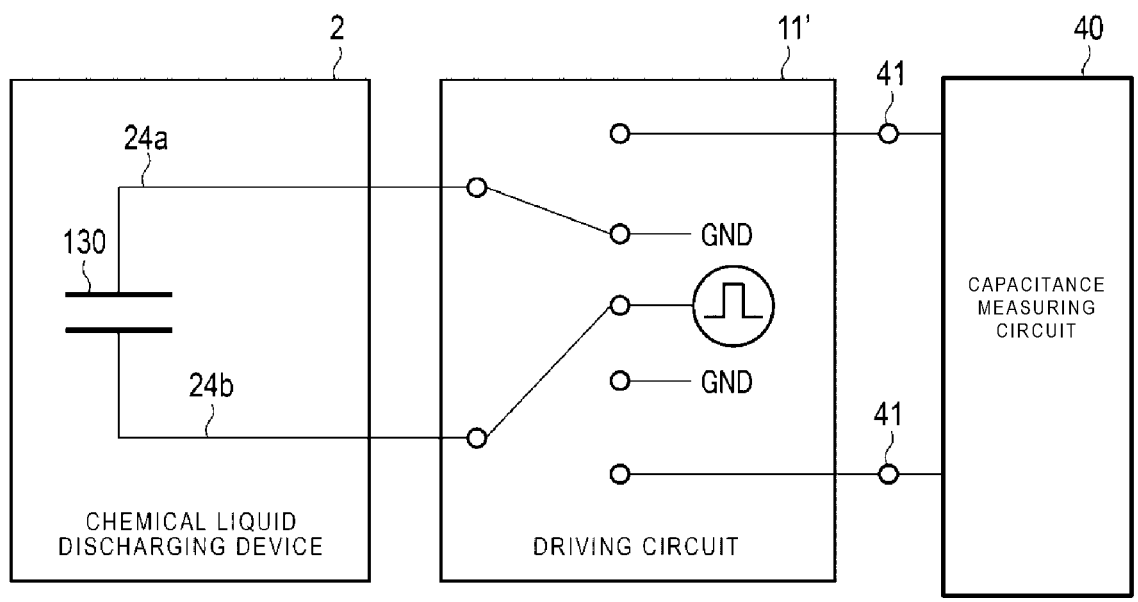
FIG. 11 is a diagram of a connection example of a driving circuit according to the second embodiment.

FIG. 11 is a diagram of an example of the connection relationship when the processor 15 performs the discharge operation using the driving circuit 11'.

As shown in FIG. 11, the driving circuit 11' is connected to the driving element 130. The driving circuit 11' is electrically connected to the wiring patterns 24a and 24b. The wiring pattern 24a is connected to GND. The wiring pattern 24b is connected to the electric power output unit of the driving circuit 11'.

The driving circuit 11' applies a voltage to the wiring pattern 24b based on the signal from the processor 15 and applies the discharge voltage to the driving element 130.

When the chemical liquid discharging device 2 has been previously used, the processor 15 does not discharge the liquid from the chemical liquid discharging device 2.

For example, when the chemical liquid discharging device 2 has been previously used, the processor 15 does not discharge the liquid even when receiving the discharge signal. The processor 15 transmits a signal indicating that the chemical liquid discharging device 2 has been previously used to the host computer 18 via the interface 17.

When the host computer 18 receives the corresponding signal, the host computer 18 displays a warning or the like indicating that the chemical liquid discharging device 2 has been previously used on the display unit 18b or the like.

The processor 15 has a function of applying a reverse voltage to the driving element 130 by using the driving circuit 11' once the liquid has been completely discharged.

That is, once the discharging of the liquid has been completed, the processor 15 connects the driving circuit 11' and the wiring patterns 24a and 24b. The processor 15 applies a reverse voltage to the driving circuit 11'. As a result, the reverse voltage is applied to the driving element 130. The driving element 130 is oppositely polarized by the reverse voltage.

Figure 12:
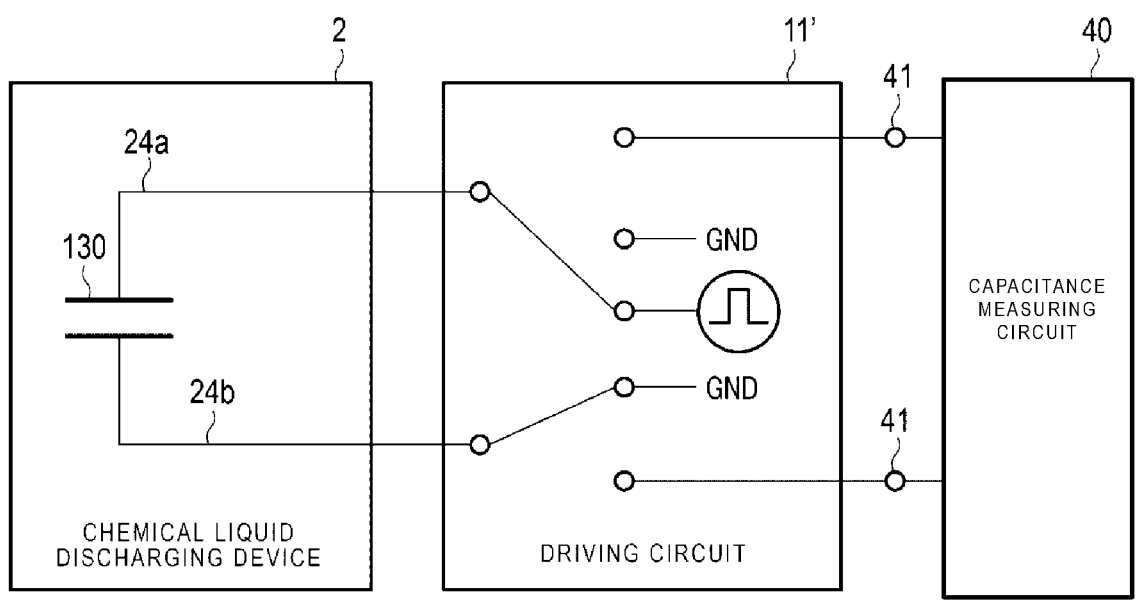
FIG. 12 is a diagram of a connection example of a driving circuit according to the second embodiment.

FIG. 12 is a diagram of an example of a connection relationship when the processor 15 applies a reverse voltage to the driving element 130 using the driving circuit 11'.

As shown in FIG. 12, the driving circuit 11' is connected to the driving element 130. That is, the driving circuit 11' is electrically connected to the wiring patterns 24a and 24b. The wiring pattern 24a is connected to the electric power output unit of the driving circuit 11'. The wiring pattern 24b is connected to GND. That is, the wiring patterns 24a and 24b are connected to the driving circuit 11' in the opposite manner to the discharging operation.

The driving circuit 11' applies a voltage to the wiring pattern 24a and applies a reverse voltage to the driving element 130 based on a signal from the processor 15.

Next, an operation example of the processor 15 of the chemical liquid dispensing apparatus 1' will be described.

Figure 13:
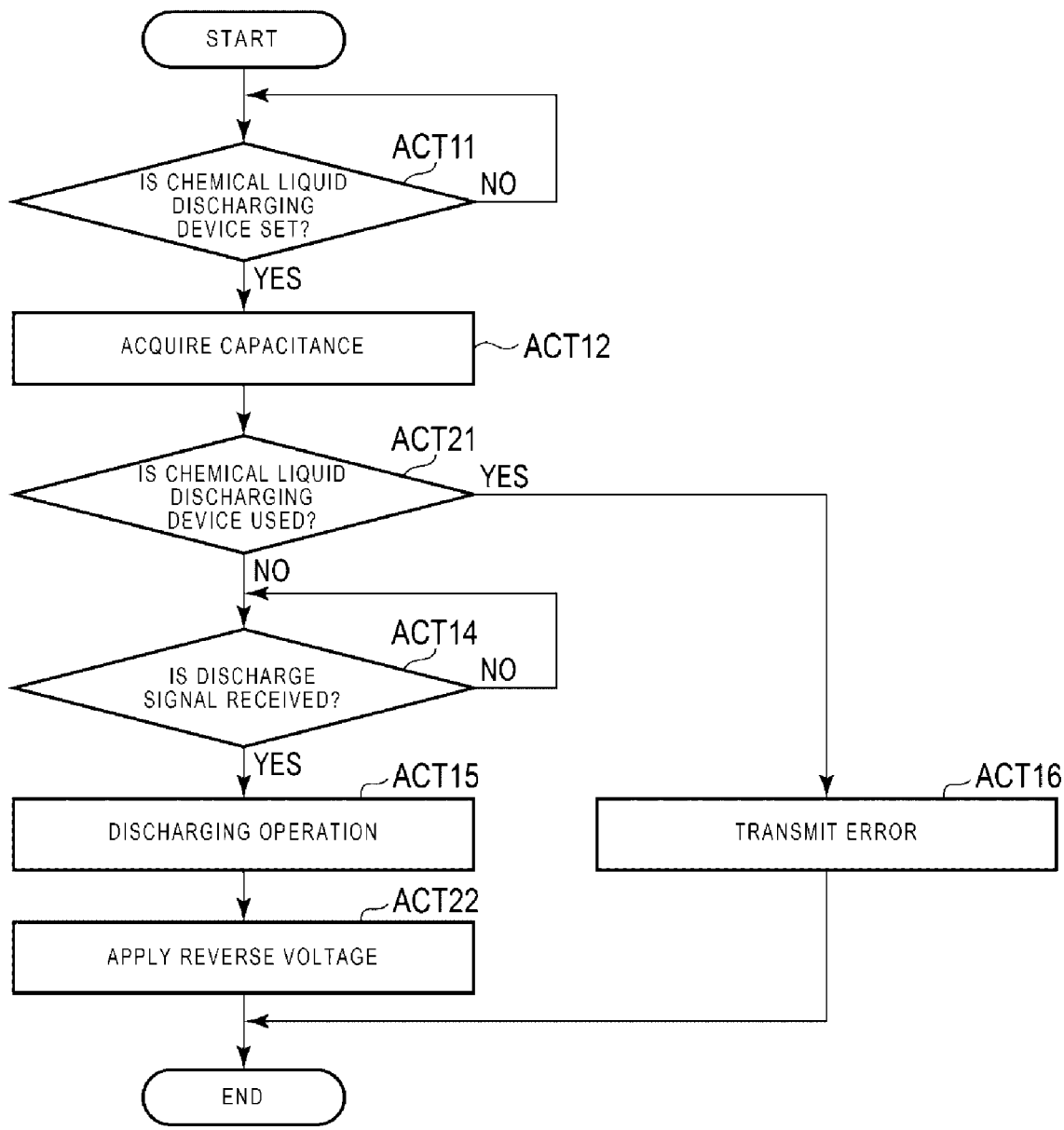
FIG. 13 is a flowchart showing an operation example of a liquid dispensing apparatus according to the second embodiment.

FIG. 13 is a flowchart for explaining an operation example of the processor 15 of the chemical liquid dispensing apparatus 1'.

The ACTs 11, and 14 to 16 are the same as those of the first embodiment, and the description thereof will not be repeated.

When the capacitance of each driving element 130 is acquired (ACT 12), the processor 15 determines whether the chemical liquid discharging device 2 has been previously used (ACT 21) based on the capacitance of each driving element 130.

When it is determined that the chemical liquid discharging device 2 has not been used (that is, unused) (ACT 21, NO), the processor 15 determines whether the discharge signal has been received through the interface 17 (ACT 14).

When it is determined that the chemical liquid discharging device 2 has been previously used (ACT 21, YES), the processor 15 transmits a signal indicating an error message that the chemical liquid discharging device 2 has been previously used to the host computer 18 through the interface 17 (ACT 16).

After the chemical liquid discharging device 2 discharges the liquid according to the discharge signal (ACT 15), the processor 15 applies a reverse voltage to the driving element 130 using the driving circuit 11' (ACT 22). After a reverse voltage is applied to the driving element 130 using the driving circuit 11', the processor 15 ends the operation.

In the discharging system of the second embodiment, once the liquid discharging apparatus has discharged the liquid, a reverse voltage is applied to the driving element of the liquid discharging device to lower the capacitance of the driving element. Therefore, the discharging system can change the capacitance of the driving element more significantly. As a result, the discharging system can more accurately determine whether the driving element has been operated.

The discharging system does not discharge the liquid from the liquid discharging device once the liquid discharging device has been previously used.

As a result, the discharging system can prevent the discharge of the liquid from a liquid discharging device that has already been used.

In the example embodiments described above, the driving element 130 that is the driving unit has a circular shape, however, the shape of the driving unit is not limited. For example, the shape of the driving unit may be a diamond shape, an ellipse shape, or the like. The shape of the pressure chamber 210 is not limited to a circular shape, and the shape of the pressure chamber 210 may be a diamond shape, an ellipse shape, a rectangular shape, or the like.

In the example embodiments described above, the nozzle 110 is disposed at the center of the driving element 130. However, as long as the chemical liquid of the pressure chamber 210 is able to be discharged, the position of the nozzle 110 is not limited. For example, the nozzle 110 may be formed the outside of the driving element 130 rather than the inside of the area of the driving element 130.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A chemical liquid dispensing apparatus, comprising:
   a mounting module including a slit through which a chemical liquid discharging device is mounted on the mounting module, the chemical liquid discharging device including an actuator and a nozzle through which a chemical liquid is discharged when a discharge voltage is applied to the actuator;
   a driving circuit electrically connected to the mounting module and configured to apply voltages to the actuator of the chemical liquid discharging device mounted on the mounting module;
   a capacitance measuring circuit electrically connected to the mounting module and configured to measure a capacitance value of the actuator of the chemical liquid discharging device mounted on the mounting module; and
   a controller connected to the driving circuit and configured to control the driving circuit to apply the discharge voltage to the actuator so that the chemical liquid discharging device mounted on the mounting module discharges the chemical liquid through the nozzle, wherein
   the controller is further configured to:
   acquire the capacitance value,
   compare the acquired capacitance value to a predetermined threshold capacitance value, and
   determine whether to cause the driving circuit to apply the discharge voltage to the actuator drive based on the comparison of the acquired capacitance value to the predetermined threshold capacitance value.

2. The chemical liquid dispensing apparatus according to claim 1, wherein
   the predetermined threshold capacitance value is the capacitance value of the actuator to which the discharge voltage has been applied, and
   if the acquired capacitance value is smaller than or equal to the predetermined threshold capacitance value, the controller is configured to cause the driving circuit to apply the discharge supply a discharge voltage to the actuator to discharge the chemical liquid.

3. The chemical liquid dispensing apparatus according to claim 1, wherein
   the controller is further configured to control the driving circuit to apply a reverse voltage to the actuator after the discharge of the chemical liquid.

4. The chemical liquid dispensing apparatus according to claim 3, wherein
   the predetermined threshold capacitance value is the capacitance value of the actuator to which the reverse voltage has been applied, and
   if the acquired capacitance value is greater than the predetermined threshold capacitance value, the controller is configured to cause the driving circuit to apply the discharge voltage to the actuator to discharge the chemical liquid.

5. The chemical liquid dispensing apparatus according to claim 4, wherein a magnitude of the discharge voltage is equal to a magnitude of the reverse voltage.

6. The chemical liquid dispensing apparatus according to claim 1, wherein
   the chemical liquid discharging device comprises a pair of wiring patterns connecting the driving circuit to the actuator, and
   the capacitance measuring circuit is configured to measure a capacitance value between the pair of wiring patterns.

7. The chemical liquid dispensing apparatus according to claim 1, further comprising:
   an interface connected to the driving circuit and the controller, and the interface is configured for transmitting and receiving data to and from an external device, wherein the controller is further configured to transmit a signal indicating that the chemical liquid discharging device has been used to the external device through the interface after the controller causes the driving circuit to apply the discharge voltage to the actuator.

8. The chemical liquid dispensing apparatus according to claim 1, further comprising:
   an interface connected to the driving circuit and controller and configured for transmitting and receiving data to and from an external device, wherein
   the controller is further configured to transmit an error signal to the external device through the interface when the acquired capacitance value is greater than the predetermined threshold capacitance value.

* * * * *